United States Patent Office 2,892,810
Patented June 30, 1959

2,892,810

NEW DERIVATIVES OF ALDEHYDE CONDENSATION PRODUCTS OF THE AMINOTRIAZINE OR UREA GROUP AND THEIR MANUFACTURE AND USE

Otto Albrecht, Neuewelt, near Basel, Switzerland, assignor to Ciba Limited, Basel, Switzerland, a Swiss firm No Drawing. Application August 22, 1955
Serial No. 529,891

Claims priority, application Switzerland August 24, 1954

5 Claims. (Cl. 260—67.6)

This invention provides new cation-active derivatives of aldehyde condensation products of compounds of the aminotriazine or urea group or ethers thereof with alcohols of low molecular weight, which derivatives contain cation-active amino groups and also atomic groupings which increase the hydrophilic character non-ionically, especially polyglycol ether groups or a plurality of hydroxyl groups, and in which derivatives any two carbon atoms bound to the same oxygen atom, if otherwise connected to one another, are so connected only through a bridge member.

The condition last mentioned above means that no epoxy groups

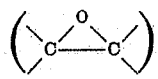

must be present in the derivatives, and that

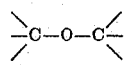

groupings either form part of a hetero cyclic ring containing at least four members or are advantageously present in an open chain.

The invention also provides a process for the manufacture of the aforesaid derivatives, wherein (a) an aldehyde condensation product of a compound of the aminotriazine or urea group or an ether thereof with an alcohol of low molecular weight or of a derivative of such compound containing a hydrocarbon radical of high molecular weight, (b) a compound capable of introducing an atomic grouping which increases the hydrophilic character non-ionically and (c) a primary, secondary or tertiary amine or a water-soluble salt, including a quaternary ammonium salt, thereof, are reacted together in any order of succession, if desired, upon a substratum, and, if an amine salt has not been used for the condensation, the base so obtained is converted into a water-soluble salt, including a quaternary ammonium salt, and, if any of the starting materials contain epoxy groups, such starting material is so selected that during the reaction the rings of all such groups are opened.

As formaldehyde condensation products of the aminotriazine group (components (a)) there may be used in general all products which contain at least one free methylol group or at least one methylol group etherified with an alcohol of low molecular weight. Among these compounds there may be mentioned above all reaction products of formaldehyde with 2:4:6-triamino-1:3:5-triazine, commonly known as melamine. Such condensation products may contain one to six methylol groups, and they are usually mixtures of different compounds. There may also be used methylol-compounds of derivatives of melamine which contain at least one amino group, for example, methylol-compounds of melam, melem, ammeline, ammelide or halogen-substituted aminotriazines, such as 2-chloro-4:6-diamino-1:3:5-triazine; and also methylol-compounds of guanamines such, for example, as those of benzoguanamine, acetoguanamine or formoguanamine.

The ethers with alcohols of low molecular weight may be derivatives of the aforesaid compounds with methyl alcohol, ethyl alcohol, a propyl alcohol or a butanol. For example, there may be used methyl ethers of methylolmelamines containing 3-6 methylol groups, in which 2-6 methylol groups are etherified. The formaldehyde condensation products may contain further substituents. They may contain ester, ether or acid amide groups. Among the ester-like compounds there come into consideration, for example, those obtained by esterifying a methylol-melamine, or an ether derived therefrom with an alcohol of low molecular weight, with an aliphatic carboxylic acid of high molecular weight, such as lauric acid, palmitic acid, stearic acid, behenic acid, oleic acid, or the fatty acids of the afterrunnings, or aromatic carboxylic acids, such as benzoic acid or substitution products thereof, or with cycloaliphatic acids such as abietic acid or naphthenic acids. Among the compounds which contain further ether groupings there come into consideration those obtainable by etherifying the aforesaid methylol-compounds, or ethers thereof with alcohols of low molecular weight, with aliphatic or araliphatic alcohols of high molecular weight, such as octyl alcohol, dodecyl alcohol, 2-butyl-octyl alcohol, cetyl alcohol, oleyl alcohol, octadecyl alcohol or benzyl alcohol. Starting materials containing amide groups may be derived from the acid amides or N-methylol-acid amides of the acids mentioned above in connection with the esters.

There may also be used for the present invention formaldehyde-condensation products of formaldehyde with guanyl-melamines, such as those obtainable in the manner described by Otto Albrecht in U.S. Patent No. 2,759,907, issued on August 21, 1956.

Such condensation products may be derived from mono-, di- or tri-guanyl-melamine or mixtures thereof, which are obtainable by treating dicyandiamide in an inert solvent with a gaseous hydrogen halide at a raised temperature, and isolating the free amine from the resulting salt by the addition of a strong alkali. Substituted guanyl-melamines may also be used for making the formaldehyde condensation products.

The formaldehyde condensation products of the aminotriazine group may be used mainly in the monomeric condition or in a partially condensed condition. The monomeric compounds, provided that they do not contain a large number of markedly hydrophobic radicals, are water-soluble. A suitable starting material is, for example, a water-soluble hexamethylol-melamine hexamethyl ether.

As formaldehyde condensation products of the urea group there may be used in the present invention, in general all products which contain at least one free methylol group or at least one methylol group etherified with an alcohol of low molecular weight. As compounds of the urea group there may be mentioned, for example, urea, thiourea and compounds containing the atomic grouping

such as dicyandiamide, dicyandiamidine, guanidine, acetoguanidine or biguanide. A suitable starting material is, for example, dimethylol-urea.

As compounds which are capable of introducing an atomic grouping which increases the hydrophilic character non-ionically (components (b)) there are included in general all those which contain or are capable of forming a plurality of hydroxyl groups or polyglycol ether chains and are capable of reacting with one of the components (a) and (c). As compounds containing a plurality of hydroxyl groups there may be mentioned aliphatic polyalcohols, such as glycerine, erythritols, pentitols and hexitols, for example, sorbitol or mannitol, and also corresponding polyoxy-carboxylic acids, such as glucuronic or galacturonic acid. These compounds are capable of reacting by etherification or esterification or re-etherification with the compounds used as components (a). Polyoxycarboxylic acids can also be condensed with amines or oxy-amines (components (c)).

There also come into consideration as compounds containing a plurality of hydroxyl groups polyvinyl alcohol, partially hydrolyzed polyvinyl esters or ethers, polymerization products of acrylic acid amides or methacrylic acid amines containing hydroxyl groups, and finally oligosaccharides and polysaccharides.

As compounds, which are capable of introducing and containing polyglycol ether chains, there are especially suitable polyglycols. Advantageously the ordinary commercial types of polyglycol ethers are used, which have an average molecular weight of 600, 1000, 1500, 3000 or higher. As components (b) there may also be used derivatives of such polyglycols, such as unilateral ethers or esters thereof, for example, a polyglycol acetate or a polyglycol methyl ether or a glycerine etherified with 1-3 polyglycols.

As compounds which are capable of introducing a plurality of hydroxyl groups or polyglycol ether chains, there may be used aliphatic alkylene oxidees of low molecular weight, such as propylene oxide, butylene oxide, glycide and especially ethylene oxide. The epoxy groups of these compounds are split up in known manner during the reactions, since they can only react in this manner.

The primary or secondary amines, which may be used themselves or in the form of water-soluble salts as components (c), may be of the aromatic, hydroaromatic, araliphatic, heterocyclic or advantageously the aliphatic series. As aliphatic amines there are advantageously used alkylamines, dialkylamines, hydroxyalkylamines, bis-(hydroxyalkyl)-amines and N':N'-dialkyl-alkylene diamines. These compounds may have straight or branched chains and be saturated or unsaturated and contain, for example, 1–18 carbon atoms. There may be mentioned, for example, methylamine, ethylamine, propylamine, isopropylamine, butylamine, isobutylamine, allylamine, mono- or di-ethanolamine, propanolamines, di-isobutylamine, N':N'-diethyl-ethylene diamine, and also polyalkylene polyamines, such as diethylene triamine, triethylene tetramine, tetraethylene pentamine or polyalkylene polyamines of higher molecular weight. Furthermore, there come into consideration amines which contain a non-aromatic, and advantageously an aliphatic, hydrocarbon radical of high molecular weight. By "hydrocarbon radicals of high molecular weight" there are meant radicals containing about 8–40 and advantageously 12–18 carbon atoms. There may be mentioned, for example, resin amines such as abiethylamine, and also fatty amines such as dodecylamine, octadecenylamine, octadecylamine and ordinary commercial mixtures thereof. The hydrocarbon radical of high molecular weight need not be bound directly to the nitrogen atom. Thus, there may be between it and the nitrogen atom bridge members interrupted by hetero atoms as in ethyl-diethylamino coconut oil fatty acid monoester and in triethanolamine mono-octadecyl ether.

Finally, there may be used di- or poly-amines containing a hydrocarbon radical of high molecular weight. Such compounds can be obtained, for example, by the additive combination of acrylonitrile with an amine containing a hydrocarbon radical of high molecular weight followed by reduction of the nitrile group to the amino group.

Among hydroaromatic amines there may be mentioned for example, cyclohexylamine, dicyclohexylamine and N-methyl-cyclohexylamine.

The araliphatic amines are advantageously benzylamine and nuclear substitution products thereof containing, for example, halogen atoms or alkyl or alkoxy groups.

The aromatic amines may be mononuclear or polynuclear, and, if desired, may contain further substituents. There are advantageously used aniline and nuclear substitution products thereof, for example, ortho- or para-toluidine, various chloranilines, ortho- or para-anisidine or the like. There may also be used naphthylamines, such as α- or β-naphthylamine and nuclear substitution products thereof.

The heterocyclic amines may contain one or more hetero atoms. There may be mentioned piperidine, α-picoline, morpholine, pyrrolidine, imidazole, benzimidazole, 2-aminothiazole, 5-aminotetrazole and tetrahydroquinoline.

Among the tertiary amines there are advantageously used those which contain a reactive hydrogen atom bound to an oxygen or sulfur atom or to another non-basic nitrogen atom. They are advantageously of the aliphatic series. There may be used tertiary alkanolamines, such as triethanolamine, diethyl-ethanolamine, tripropanolamine, β-hydroxyethylmorpholine, and also condensation products of such alkanolamines with polyglycols or alkylene oxides, and partial esters of such alkanolamines with carboxylic acids, such as triethanolamine stearic acid monoester, ether-like reaction products of alkanolamines with N-methylolamides, for example, the reaction products of one molecular proportion of triethanolamine with one or two molecular proportions of stearic acid-N-methylolamide. Compounds which contain, in addition to the tertiary nitrogen atom, a further nitrogen atom which is non-basic, are more especially those derived from aliphatic polyamines, which contain in addition to at least one tertiary amino group a primary amino group which is acylated. Such a compound is, for example, N':N'-diethyl-ethylene diamine acylated with stearic acid.

When salts of the amines are used in the condensation, it is of advantage to use those of the usual inorganic or organic acids, such as the hydrochlorides, sulfates, phosphates, acetates or formates. When the salt formation is carried out after the condensation, the usual organic or inorganic acids may likewise be used. For producing quaternary ammonium groups, which may be introduced into the end product or into the component (c) before the condensation, there may be used the ordinary quaternating agents, for example, dimethyl sulfate, benzyl halides, such as benzyl chloride, or chloracetic acid derivatives, such as chloracetamide. When a chloracetic acid derivative, for example, chloracetamide or N-methylol-chloracetamide, is used such derivatives may be reacted with one of the compounds suitable as components (a) and the reaction product subsequently condensed with a tertiary amine. This latter reaction may also be carried out on a substratum, if desired. Epihalogenhydrins, such as epichlorhydrin, are not included in the process of this invention, because these compounds retain the epoxy groups, so that the rings are not opened.

Instead of using single compounds from among the reaction components (a), (b) and (c) in the process of the invention, it will be understood that mixtures of two or more such compounds may be used.

The derivatives may be made by the process of this invention by first condensing a component (a) with a component (b) and reacting the resulting condensation product with a component (c), or by first reacting a component (a) with a component (c) and then reacting the product so obtained with a component (b), or by first condensing a component (b) with a component (c) and reacting the condensation product so obtained with a component (a). Alternatively, all three components may be reacted together simultaneously.

However, it is of advantage first to react together components (b) and (c) and to react the resulting binary condensation product with a component (a). An advantageous form of the process consists in condensing together components (a) and (b) and reacting the resulting product with a component (c). It may also be of advantage, on the one hand, to react a part of component (b) with component (a) and, on the other to react another part of component (b) with component (c), and then to react together the two binary condensation products so obtained.

The several reactions may be carried out under conditions known for condensations of this kind. The components are advantageously reacted at a high temperature, preferably at temperatures above 80° C., for example, within the range of 100–200° C. The reaction components can be simply melted together or they may be reacted in the presence of an inert solvent. It may be of advantage to carry out the reactions under reduced pressure and/or in an inert gas, for example, in a current of nitrogen.

The relative proportions of the components used depend principally on the number of methylol or methylol ether groups present in component (a). In order that the condensation product shall still be capable of hardening, the molecular proportions of the components must in all cases be so chosen that at least one free methylol group or at least one methylol group etherified with an alcohol of low molecular weight be present in the end product. The proportion of component (b) depends on the hydrophilic character desired in the end product. When there are used as components (a) or (c) compounds containing markedly hydrophobic groups, for example, hydrocarbon radicals of high molecular weight, which may be of advantage to impart a favorable feel to the treated material, the proportion of component (b) should be greater than when no such hydrophobic groups are present. The degree of the cation-activity of the condensation products can also be varied by varying the proportion of component (c) and the choice of the amine used. In general it is of advantage to prepare compounds which contain more than one, for example, two to four, cation-active groups per mol of an aminotriazine compound. This is the case when there is used for one molecular proportion of component (a) several molecular proportions of a monamine or one or more molecular proportions of a polyamine.

The condensation products of this invention are soluble or easily dispersible in water at least in the form of their salts with the usual acids. They are suitable for improving the properties of electrical conductivity of various materials, especially textiles of synthetic fibers, and are therefore advantageously used in the form of their water-soluble salts in aqueous solution for treating such materials. However, the treatment may be carried out in a non-aqueous medium, for example, in a solvent of the kind used in dry-cleaning, in which case the free bases or salts thereof soluble in these solvents are used. For treating the material with aqueous solutions the usual impregnation methods used in the textile industry are suitable. When hardenable products are used, it is of advantage, after impregnating the material and drying it, to bring about hardening at a raised temperature, for example, 120–150° C. In this case it is of advantage to add a hardening catalyst. As such catalysts there may be used the usual hardening catalysts, for example, acids such as hydrochloric acid, sulfuric acid or formic acid. There may also be used salts of strong acids with weak bases, for example, ammonium salts of strong inorganic or organic acids, such as ammonium chloride, ammonium sulfate, ammonium nitrate, ammonium oxalate or ammonium lactate. When solutions in organic solvents are used there come into consideration catalysts which are soluble in the organic solvent, for example, strong organic acids, such as formic acid, acetic acid, chloracetic acid or compounds, liberating acids at a raised temperature, such as tartaric acid diethyl ester or triacetin.

It may also be of advantage, in addition to or instead of the hardening, to fix the impregnation better on the material by treatment with a cross-linking component. As cross-linking components there may be used the polyfunctional compounds known in the art of dressing materials, such as formaldehyde, di- or poly-hydroxyl compounds, di-isocyanates or derivatives thereof, etc.

There may also be used products which contain one or more polymerizable groups, and can be polymerized on the treated material. Compounds of this kind, which contain no atomic groupings capable of increasing the hydrophilic character non-ionically, are described, for example, in U.S. patent application, Serial No. 375,832, filed August 21, 1953, by Richard Sallmann et al. By introducing groups increasing the hydrophilic character in suitable compounds described in the aforesaid specification, the resulting products can be used for the purposes of this invention. When polymerizable condensation products of this kind are used, it is of advantage to add an ordinary polymerization catalyst, such as a peroxide or per-salt.

It is to be understood that in the impregnation methods of the invention a very wide variety of methods of fixation may be used, and that different methods of this kind may be used in combination with one another. It is also possible, as has been stated above, to carry out the impregnation by forming the condensation product from the appropriate components on the material to be treated.

The materials, of which the surface conductivity is to be improved, may be of inorganic or organic character. As inorganic materials there may be mentioned, for example, glass fibers and fabrics produced therefrom. As organic materials there come into consideration, more especially, artificially made textile materials, which may be in the form of foils, loose fibers, yarns or webs. There may be mentioned materials made of cellulose esters, for example, cellulose acetate artificial silk, and also those produced by polycondensation, such as polyamides (nylon or "Perlon") and polyesters ("Terylene" and "Dacron"), and finally those produced by polymerization, such as polyvinyl chloride or polyacrylic derivatives. The treatment of mixed fibers or mixed fabrics composed of different artificial fibers or artificial fibers and natural fibers is also included.

The following examples illustrate the invention, the parts being by weight unless otherwise stated, and the relationship of parts by weight to parts by volume being the same as that of the kilogram to the liter:

*Example 1*

324 parts (1 mol) of finely pulverized hexamethylolmelamine are introduced, while stirring, at room temperature into 2000 parts by volume of methyl alcohol containing 100 parts by volume of concentrated hydrochloric acid. After 10 minutes dissolution of the methylol-compound is complete. The solution is then immediately stirred with about 160 parts of calcined sodium carbonate until the reaction is neutral to litmus. The precipitated salt is filtered off, and the solution is evaporated to a syrup in vacuo. The syrup, having been concentrated to about 99 percent, is then filtered hot in order to remove residual salt.

10.8 parts of the hexamethylol-melamine hexamethyl ether so obtained and 11.1 parts of chloracetic acid-N-methylolamide are heated for about 50 minutes under about 13 mm. pressure of mercury in a bath having a temperature of 120–125° C.

2.2 parts of the resulting condensation product and 5.3 parts of the hydroxyethylation product described below are stirred for 6 hours in a boiling water bath.

There is obtained a honey-like mass which is soluble in water. For the purpose of further purification the reaction product may be stirred with ether in which it is sparingly soluble.

The above-mentioned hydroxyethylation product is prepared by heating 20 parts of a mixture of N-alkyl-trimethylene diamines, in which the alkyl residues correspond to those of the fatty acids of tallow, at 135° C. and, after the addition of 0.2 part of sodium, introducing ethylene oxide as a finely distributed gas stream at 135–140° C. until 33 parts have been taken up.

The reaction product obtained as described in the first three paragraphs of this example can be used as an antistatic agent as follows:

Nylon yarn is treated at a liquor ratio of 1:30 with a solution containing 10 grams of the condensation product and 5 grams of ammonium chloride, per liter, for 30 minutes at room temperature, and after removing excess of water the yarn is dried. By this treatment the surface conductivity of the material is substantially increased.

*Example 2*

Nylon yarn is treated at room temperature for 30 minutes at a liquor ratio of 1:30 with a solution containing, per liter, 5 grams of the condensation product described below and 5 grams of the hydroxyethylation product derived from N-alkyl-trimethylene diamines as described in the fourth paragraph of Example 1, and also 5 grams of ammonium chloride.

After drying the material so treated, it is heated for one hour at 120° C. By this treatment the surface conductivity of the textile material is substantially improved.

The condensation product referred to above is prepared as follows:

10.8 parts of the hexamethylol-melamine hexamethyl ether described in the first paragraph of Example 1 and 36 parts of an ordinary commercial mixture of polyethylene glycols having an average molecular weight of 600 are heated under reduced pressure produced by a water jet pump for 2 hours, while stirring, in a bath having a temperature of 120–125° C. The bath temperature is raised in the course of one hour to 160° C., and then in the course of a further hour to 190° C. By the end of this period thickening of the reaction product has occurred.

30.5 parts of the condensation product so obtained and 2.5 parts of chloracetic acid N-methylolamide are heated for 30 minutes under reduced pressure produced by a water jet pump in a heating bath having a temperature of 120–125° C.

There is obtained a stiff jelly, which is soluble in hot water and also in acetone.

*Example 3*

51.5 parts of diethylene triamine are heated at 120–125° C., and then ethylene oxide is introduced as a finely distributed gas stream until 110 parts have been taken up.

38.4 parts of the resulting hydroxyethylation product, 71.2 parts of stearic acid N-methylolamide prepared from commercial stearic acid and 4.8 parts of sodium carbonate are heated in a current of nitrogen at 108° C., and then the internal temperature is maintained for 4 hours at 108–112° C. During the first hour the pressure is maintained at about 560 mm. of mercury, for the second hour at about 360 mm. and for the two final hours at about 160 mm.

13.2 parts of the resulting reaction product and 5.4 parts of the hexamethylol-melamine hexamethyl ether described in Example 1 (first paragraph) are heated in the course of 2 hours to 120–125° C., then a further hour to 160° C. and finally in the course of 2 hours to 200–205° C. (temperature of the heating bath).

8 parts of the resulting melamine derivative are heated with 1 part of benzyl chloride for 6 hours, while stirring, in a boiling water bath in a current of nitrogen. After being extracted with petroleum ether, the new condensation product is taken up in water to give an opalescent solution. It can be used as an antistatic agent as follows:

Nylon yarn is treated at a liquor ratio of 1:10 with a solution containing, per liter, 10 grams of the condensation product and 5 grams of ammonium chloride for 20 minutes at 20° C., and then the impregnated textile material is dried. By this treatment the surface conductivity of the material is substantially improved.

*Example 4*

20 parts of a mixture of N-alkyl-trimethylene diamines in which the alkyl residues correspond to those present in the fatty acids of tallow are heated to 135° C., and then, after the addition of 0.2 part of sodium, ethylene oxide is introduced as a finely distributed gas stream at 135–140° C. until 33 parts have been taken up.

10.6 parts of the resulting hydroxyethylation product and 7.2 parts of the hexamethylol-melamine hexamethyl ether described in the first paragraph of Example 1 are stirred for 2 hours in a heating bath having a temperature of 120–125° C. The bath temperature is raised in the course of one hour to 160° C., and then in the course of 2 hours to 200–205° C. The final product is a thick liquid mass which is soluble in water.

11.2 parts of the resulting condensation product are mixed with 1.92 parts of dimethyl sulfate, and the mixture is heated, while stirring, for one hour at 60–65° C. and then for a further 30 minutes at 70–75° C. By the end of this time the reaction mixture has thickened considerably. The quaternary ammonium compound so obtained may be used as an antistatic agent, for example, as follows:

Yarn made of polymerized caprolactam is treated with a solution containing, per liter, 5 grams of the above condensation product and 5 grams of ammonium chloride. After removing excess water from the material and drying it, the yarn so treated has a substantially higher surface conductivity than the untreated yarn.

*Example 5*

103 parts of diethylene triamine are heated in a current of nitrogen at 140–150° C. in a vessel fitted with a descending condenser and stirring means, and then 540 parts of commercial stearic acid are introduced in small portions in the course of 4 hours. The whole is heated for a further 4 hours at 160–165° C., during which nitrogen is introduced continuously.

80 parts of the acylation product so obtained are heated at 110° C. after the addition of 0.8 part of sodium, and then ethylene oxide is introduced as a finely distributed gas stream at 110–130° C. until the increase in weight amounts to 108 parts.

53.8 parts of the resulting hydroxyethylation product and 9 parts of the hexamethylol-melamine hexamethyl ether described in the last paragraph of Example 1 are heated in the manner described in the third paragraph of Example 1 and finally at 200–205° C.

24 parts of the reaction product so obtained are mixed with 0.9 part of glacial acetic acid, and the whole is heated on a water bath until a homogeneous reaction mixture is obtained. The new acetate dissolves clearly in water. It can be used for increasing the surface conductivity of nylon, the nylon material so treated, when rubbed against wool, exhibiting a much smaller charge than the untreated nylon. The antistatic dressing may be applied as follows: A fabric of polyamide yarn, such as is obtainable from hexamethylene diamine and adipic acid (nylon fabric) is treated on a foulard with a solution containing, per liter, 10 grams of the aforesaid acetate, 0.5 gram of ammonium chloride and 0.33 gram of tartaric acid, and the treated fabric is dried and, if desired, subjected to a hardening treatment for one hour at 120° C.

What is claimed is:

1. A cation active product selected from the group consisting of condensation products obtained by condensing hexamethylolmelamine hexamethylether with an amine, salts obtained from such condensation products and quaternary ammonium compounds obtained by quaternizing at least one tertiary nitrogen atom of such condensation products; said amine being an amine as defined below and further substituted to introduce ethylene oxide groups at the sites of said amine where hydrogen is present as a member selected from the group consisting of amino hydrogen and hydroxyl hydrogen the amount of ethylene oxide introduced being at least sufficient to react with all of the hydrogens at said sites; said amine being a member selected from the group consisting of (A) aliphatic monoamines in which the radicals attached to amino nitrogen atoms are selected from the group consisting of alkyl and hydroxyalkyl radicals, said amine containing at least one reactive hydrogen of the class consisting of hydrogen attached to amino nitrogen and hydroxyl hydrogen; (B) alkylene polyamines, the terminal nitrogens of which are present in radicals selected from the group consisting of $H_2N—$ and alkyl $NH—$ radicals, the alkylene radicals of the alkylene polyamines each having at least two carbon atoms; and (C) alkylene polyamines as in (B) which are partially acylated with a higher fatty acid.

2. A cation active product which has been obtained by condensing 1 mol of diethylene triamine with 5 mols of ethylene oxide, condensing this product with 2 mols of stearic acid N-methylol amide, by further condensing 1 mol of the product of this condensation with 1 mol of hexamethylolmelamine hexamethyl ether and quaternizing the product thus obtained with benzyl chloride.

3. A cation active product which has been obtained by condensing 2 mols of hexamethylol melamine hexamethyl ether with 1 mol of the condensation product of 15 mols of ethylene oxide with 1 mol of a mixture of N-alkyl-trimethylene diamines, in which the alkyl radicals are those of the fatty acids of tallow, and quarternizing the product thus obtained with dimethylsulfate.

4. A cation active product which has been obtained by condensing 1 mol of diethylene triamine with 2 mols of stearic acid, condensing 1 mol of the resulting product with 18 mols of ethylene oxide, further condensing 1½ mols of the resulting hydroxyethylation product with 1 mol of hexamethylol melamine hexamethyl ether and converting the product obtained into the acetate with acetic acid.

5. A cation active product selected from the group consisting of condensation products obtained by condensing hexamethylolmelamine hexamethylether with an amine, salts obtained from such condensation products and quaternary ammonium compounds obtained by quaternizing at least one tertiary nitrogen atom of such condensation products; said amine being a condensation product of an N-methylol amide of a higher fatty acid with an alkylene polyamine, the terminal nitrogens of which are present in radicals selected from the group consisting of $H_2N—$ and alkyl $NH—$ radicals, the alkylene radicals of the alkylene polyamines each having at least two carbon atoms; and said amine being further substituted to introduce ethylene oxide groups at the sites of said amine where hydrogen is present as amino hydrogen, the amount of ethylene oxide introduced being at least sufficient to react with all the hydrogens at said sites.

References Cited in the file of this patent

UNITED STATES PATENTS

| Number | Name | Date |
|---|---|---|
| 2,136,928 | Schlack | Nov. 15, 1938 |
| 2,577,767 | Jones | Dec. 11, 1951 |
| 2,594,452 | Kosmin | Apr. 29, 1952 |
| 2,616,861 | Jones | Nov. 4, 1952 |
| 2,678,308 | Suen | May 11, 1954 |
| 2,769,796 | Suen et al. | Nov. 6, 1956 |
| 2,769,799 | Suen et al. | Nov. 6, 1956 |